(12) United States Patent
Panesar et al.

(10) Patent No.: US 10,918,958 B2
(45) Date of Patent: Feb. 16, 2021

(54) USER ANALYSIS SYSTEM AND METHOD

(71) Applicant: Sony Interactive Entertainment Inc., Tokyo (JP)

(72) Inventors: Pritpal Singh Panesar, London (GB); Mohammed Mansoor Nusrat, London (GB); Nicholas Anthony Edward Ryan, London (GB); Hugh Alexander Dinsdale Spencer, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/475,403

(22) PCT Filed: Jan. 5, 2018

(86) PCT No.: PCT/GB2018/050022
§ 371 (c)(1),
(2) Date: Jul. 2, 2019

(87) PCT Pub. No.: WO2018/127703
PCT Pub. Date: Jul. 12, 2018

(65) Prior Publication Data
US 2020/0155947 A1 May 21, 2020

(30) Foreign Application Priority Data
Jan. 9, 2017 (GB) .................................. 1700320.3

(51) Int. Cl.
*A63F 13/795* (2014.01)
*A63F 13/216* (2014.01)
(Continued)

(52) U.S. Cl.
CPC .......... *A63F 13/795* (2014.09); *A63F 13/216* (2014.09); *A63F 13/35* (2014.09);
(Continued)

(58) Field of Classification Search
None
See application file for complete search history.

(56) References Cited

U.S. PATENT DOCUMENTS 8,968,067 B1 3/2015 Curtis
9,498,704 B1 11/2016 Cohen
(Continued)

FOREIGN PATENT DOCUMENTS

EP 3565650 A1 11/2019

OTHER PUBLICATIONS

International Search Report and Written Opinion for corresponding PCT Application No. PCT/GB2018/050022, 17 pages, dated Mar. 22, 2018.
(Continued)

*Primary Examiner* — Ronald Laneau
(74) *Attorney, Agent, or Firm* — Matthew B. Dernier, Esq.

(57) ABSTRACT

A user analysis method for assisting a current user within the videogame includes: measuring one or more indicators of success for a scenario within the videogame as played by the current user, detecting if the one or more measured indicators of success are below an evaluation threshold, and if so then providing a hint to the current user relating to successful behaviour in the scenario, wherein providing a hint has a measuring step including measuring one or more indicators of behaviour for the scenario within the videogame as played by the current user, an evaluating step including evaluating the one or more measured indicators of behaviour with respect to data derived from a corpus of measured indicators of behaviour previously generated for other users for the scenario, a difference detecting step including detecting a respective difference in the one or more measured indicators of behaviour between the current user and a
(Continued)

subset of other users detected to have a predetermined level of success in the scenario, and the providing step including providing a hint to the current user indicating a change in one or more behaviours that reduces a respective difference in the one or more measured indicators of behaviour between the current user and the subset of other users detected to have a predetermined level of success in the scenario.

14 Claims, 2 Drawing Sheets

(51) Int. Cl.
    *A63F 13/46*       (2014.01)
    *A63F 13/5375*     (2014.01)
    *A63F 13/67*       (2014.01)
    *A63F 13/798*      (2014.01)
    *A63F 13/35*       (2014.01)
    *A63F 13/79*       (2014.01)

(52) U.S. Cl.
    CPC .......... *A63F 13/46* (2014.09); *A63F 13/5375* (2014.09); *A63F 13/67* (2014.09); *A63F 13/79* (2014.09); *A63F 13/798* (2014.09); *A63F 2300/305* (2013.01); *A63F 2300/558* (2013.01)

(56) References Cited

U.S. PATENT DOCUMENTS

| 10,675,544 | B2* | 6/2020 | Stroud | A63F 13/533 |
|---|---|---|---|---|
| 2009/0209337 | A1 | 8/2009 | Vrignaud | |
| 2010/0009750 | A1 | 1/2010 | Egozy | |
| 2010/0041475 | A1 | 2/2010 | Zalewski | |
| 2012/0276992 | A1 | 11/2012 | Moinuddin | |
| 2014/0255881 | A1 | 9/2014 | Rom | |
| 2015/0348071 | A1* | 12/2015 | Cochrane | G06F 16/958 705/7.32 |
| 2016/0045828 | A1 | 2/2016 | Bowron | |
| 2019/0329138 | A1 | 10/2019 | Panesar | |

OTHER PUBLICATIONS

Combined Search and Examination Report for corresponding GB Application No. GB1700320.3, 2 pages, dated Jun. 15, 2017.
Examination Report for corresponding GB Application No. GB1700320. 3, 4 pages, dated Nov. 27, 2019.
Communication Pursuant to Article 94(3) EPC for corresponding EP Application No. 18703812.0, 4 pages, dated Aug. 12, 2020.

\* cited by examiner

USER ANALYSIS SYSTEM AND METHOD

BACKGROUND

The present invention relates to a user analysis system and method.

Modern games can be very complex and feature rich. Examples of such games are so-called 'open world' games, where the user is free to explore and interact with a wide range of non-player characters, with limited guidance as to what to do and typically a wide range of options available as to how they might interact (either in terms of dialogue or in terms of weaponry and tactics, depending on the encounter).

To help guide the user in a nonintrusive way, it is therefore commonplace for developers to display useful messages about gameplay technique whilst the game is loading. Over time, this exposes the user to useful information about the game, whilst giving them something of interest to read while the game loads.

SUMMARY

However, there is a limit to the number of such messages that can be provided, and after a while their value to the user decreases.

The present invention seeks to mitigate or alleviate this problem.

In a first aspect, a user analysis method of assisting a current user within the videogame is provided.

In another aspect, user analysis system arranged to assist a current user within the videogame is provided.

Further respective aspects and features of the invention are defined in the appended claims.

BRIEF DESCRIPTION OF THE DRAWING

Embodiments of the present invention will now be described by way of example with reference to the accompanying drawings, in which.

DETAILED DESCRIPTION

A user analysis system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

An example of a system upon which games may be played is the Sony® PlayStation 4® entertainment device or console.

Figure 1:
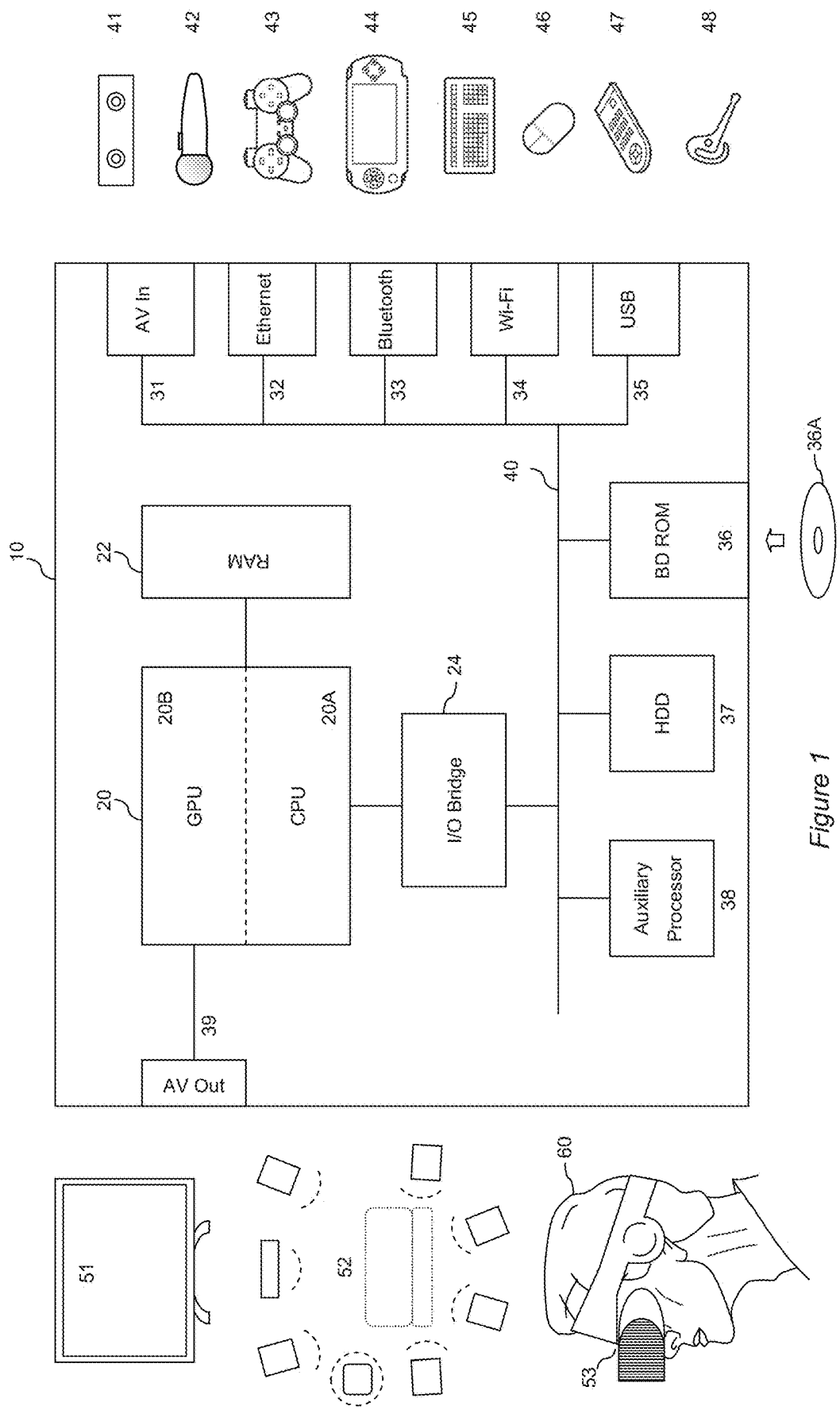
FIG. 1 is a schematic diagram of an entertainment device in accordance with an embodiment of the present invention.

FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

In an embodiment of the present invention the entertainment device, operating under suitable software instruction, may act as a user analysis system by implementing a method that provides tailored hints and advice for the user.

In an embodiment of the present invention, the method comprises maintaining one or more statistics about one or more aspects of gameplay by the user. Example statistics can relate to various measures of success or failure, and typically these will positively correlate with measures relating to various in-game behaviours. These measures can for example be specific to an individual encounter or class of encounters, to the possession or use of an object or character ability, and/or to overall measures of success within a particular quest, a particular level or area, or in relation to the game as a whole. Some non-limiting examples are provided later herein.

It will be appreciated that typically a videogame is played by many tens or hundreds of thousands of users, and cumulatively may be played by millions. Consequently, their respective recorded statistics relating to successes, failures and behaviours can be collated and analysed to determine what behaviours correlate with success, in order to provide advice to the current user without the need to create pre-scripted hints (although of course these can still be provided if desired).

For the purposes of explanation, a non-limiting example of the scheme may be illustrated with reference to a current user's encounter with a monster within a game. The monster has a vulnerability to a particular weapon, has a powerful attack within a range of 3 metres, but cannot move quickly when in water.

In this illustrative example, the user is having difficulty beating this monster. The encounter may be a one-off event that the user has failed to complete, or this monster may be of a type regularly encountered but where the user has relative difficulty beating the monster.

This difficulty may be automatically detected for example by measuring the time taken between initially engaging with the monster and defeating it, and/or measuring the number of weapon strikes made against the monster and/or measuring the amount of health damage taken by the user's character during the battle with the monster, and/or the number of times the user has died battling the monster. These measurements can be considered proxies for the users relative success or failure in battling the monster. Other measurements will be apparent to the skilled user, and as noted above different measurements may be suitable for different scenarios.

Any suitable combination of measures indicative of how difficult the user finds the encounter with the monster may then be compared with measures collated and analysed from a plurality of other users. This comparison may be done on a remote server, or the analysed results may be periodically transmitted to the entertainment device for local comparison (for example with any patches or DLCs, or as a periodic background activity). The comparison may also be made based on only a subset of other users, for example those users having a similar in-game skill level, character class, weapon collection or the like that may influence their gameplay or constrain their current options. Such a subset of users may be termed 'peer' users. This refinement helps to make the comparison between the current user and the sample population more relevant.

Among other users, there will be a range of levels of success and failure. The current user's success may be compared against the average level of success (for example any suitable combination of an average fight duration, average number of hits, and average damage taken during a successful encounter with the monster that resulted in its defeat), and if the user's success rate is below the average for the sample population, this can be detected as indicating a need for advice about battling the monster.

It will be appreciated that determining the need for advice may be based on any suitable measure of success or failure (i.e. lack of success) and on any suitable deviation from the mean of that measure derived from other users.

Hence for example, instead of simply determining whether the user is below average, it may be determined that the user is 0.5, 1 or 1.5 standard deviations below the mean, or 1 standard deviation below the mean for only the top 10% of players under comparison, as determined based on one or more collated measures of success. Hence the former example may provide remedial guidance (because the user one of the worst overall players with respect to this monster) whilst the latter example may provide aspirational guidance (because the user is not yet as good as the best). It will be appreciated that different measures may be used depending for example on a user-selected difficulty level, either for the game overall or specifically for the level of hint provided.

Alternatively, a detection of failure may be determined by setting a predetermined threshold number of times that the user might die when fighting the same monster. This threshold may be a preset number or may be derived algorithmically, for example as a function of the difference between in-game 'levels' of the user's character and the monster. Hence where the monster is of a higher level than the user's character, more deaths might be expected before the user is deemed to be struggling. Similarly predictable measure of failure may be automatically detected, such as not reaching a checkpoint within a predetermined time, or attempting to perform an action without possessing a required object, attribute or skill level. However, in these cases whilst the failure may be predictable, the reason for failure may not be and would benefit from analysis. It will be appreciated that such a measure of failure is equivalent to a measure of a lack of success.

In any event, once it has been detected that the user would benefit from advice in battling the monster, it becomes desirable to provide that advice.

In one embodiment of the present invention, advice relating to the monster has already been prepared by the game developer, but has not yet been seen by the user, or was seen sufficiently long ago that the user has forgotten about it (this may occur when there are hundreds of different hints that may be selected during game loading). Accordingly, advice relating to the monster may be given a high priority within a hint selecting algorithm, so that the developer's advice is presented more prominently or frequently until the user's rate of success improves.

Alternatively or in addition, there may not be advice relating to this particular monster, or more generally there may not be advice relevant to how the user's particular behaviour needs to be corrected in order to achieve success in a given scenario.

Consequently in an embodiment of the present invention, a comparison of the measured statistics for the encounter between the current user and the relevant sample population of users can be undertaken. For example in the remedial example where the user is relatively poor, statistics relating to those players whose success is above average may be used, whilst in the aspirational example where the user is good but could be better, statistics relating to the top 10% of players may be used.

In relation to the example of the monster encounter, the following statistics may be found:
  current user fights with weapon A;
  current user typically manages 20 hits;
  current user stands on average 2 m from the monster;
  current user fights the monster on terrain type i. (land) 70% of the time, and on terrain type ii. (water) 30% of the time; and
  current user dies on average during 70% of encounters with the monster.
Meanwhile, the statistics for above-average players are:
  these players fight with weapon A 30% of the time, and with weapon B 70% of the time;
  these players typically manage 30 hits;
  these players stand on average 2.5 m from the monster;
  these players fight the monster on land 50% of the time and on water 50% of the time;
  these players die on average during 25% of encounters with the monster.

Further, the statistics for the best players are:
these players fight with weapon A 10% of the time, and with weapon B 90% of the time;
these players typically manage 35 hits;
these players stand on average 3.5 m from the monster;
these players fight the monster on land 25% of the time and on water 75% of the time;
these players die on average during 5% of encounters with the monster.

Of these statistics, the choice of weapon, the distance from the monster and the choice of terrain all relate to how superior players chose to fight the monster (i.e. their behaviour), whilst the number of hits and their survival rate relate to their relative success. As noted above, the success related statistics can initially be used to determine if the user needs help (for example by comparison with an average value for these measurements), and here they can be used to determine a subset of (more) successfully users against whose in-game behaviours the current user's own behaviours can be compared.

Accordingly, a hint generator may be provided that looks for the largest differences between the user's behavioural statistics and those of successful players.

In the remedial case, in a comparison between the user's statistics and those of above average players, the largest difference appears to be the choice of weapon, with the current player being in a 30% minority group.

Consequently the generator may create a hint based on the available data which indicates that it is better to choose weapon B to fight this monster. Clearly language can be used that is appropriate to the game, such as "Experienced knights report that [weapon B] was particularly effective against [the Monster]". Any suitable fiction could be provided to deliver this advice in a natural manner, such as for example journal entries from a mentor.

Alternatively where the deficiency in behaviour relates to an action that can be characterised by a continuous variable (such as timing, distance or speed—for example when cornering on a race track), a corrective message may indicate a change in behaviour needed to reduce a numeric gap between the user's measured behaviour and that of the successful peers. For example 'Top drivers slow down to 60 miles per hour on hairpin bends', or 'Drivers of [player's current car] report they need to brake earlier on hairpin bends'.

Returning to the example, once the current users' poor choice of weapon has been addressed so that the user now fights with weapon B, their performance may improve, but could improve further.

Hence in the aspirational case, in a comparison between the current user's updated statistics and those of the best players, the largest difference could now either be the choice of terrain or the average distance from the monster.

It will be appreciated therefore that in some circumstances, there is no clear overall 'winner' in terms of the most different behaviour, or that the difference in behaviour is not very large.

To address this, optionally the system can look at increasingly more successful players until a winning or sufficiently large difference in behaviour emerges. Hence for example the system may initially compare the user's behaviour with the top 50% of players (assuming the current user is initially below average), and if no clear guidance is detectable, move on successively to the top 25%, top 10%, top 5% and top 1% of players, to determine if a winning set of behaviours emerges. It will be appreciated that the particular percentages used are purely illustrative and non-limiting.

Alternatively or in addition, optionally for any comparison of behaviour the system may look at the measures of success relating to the different permutations of such statistics, for example comparing the death rate for those who stand at a distance on land against those who stand close in water, to choose which change of behaviour to hint at next.

Alternatively or in addition, where the overall population of other users is large enough to provide a statistically significant result for specific sub-sets of data, optionally the system may analyse the statistics for those players whose statistics indicate they choose to fight the monster in a generally similar way to the user, but in one case do so from a further distance, and in another case do so on different terrain. By comparing the change in death rate as a function of the change in these respective behaviours, the most advantageous change of behaviour can be identified and chosen to hint at next. Hence more generally where the sample population allows, the (rate of or absolute) change of success as a function of the (rate of or absolute) change of respective behaviours can be analysed to determine which change behaviour will provide the greatest change in success.

Alternatively, simply the next largest difference between the current user's statistics and those of the compared population may be selected to hint at next.

This process can continue until the user achieves a predetermined level of success (for example average success or top N percent where N is a predetermined number) within the compared population, or a predetermined maximum number of hints may be displayed in relation to a given scenario, or such a hint or hints may only be prioritised for a predetermined period of time in-game. Clearly if the hint is scenario specific and the scenario has ended, then that hint need not be displayed again (for example if the defeated monster was a one-off such as in a boss battle, or related to a quest that has been completed).

Hence more generally, a current user's measures of success during gameplay are compared with measures of success within a selected population of users to determine the current user's relative success, and where this success is below a threshold, a hint may be provided.

As noted previously this hint may have already been prepared by the developer, but is re-prioritised.

Alternatively, as noted previously the hint can be constructed in response to the apparent deficiencies in the user's behaviour compared to the sample population. This is done by comparing the current user's measure behaviours with the behavioural statistics of a successful subset of the selected population of users, and identifying those behaviours having the greatest difference with respect to those of the successful subset.

A hint can then be automatically constructed indicating a change in behaviour that would reduce this difference.

In this way, hints relevant to the individual behaviour of the current user can be constructed without the need of the developer to exhaustively anticipate and prepare such hints in advance. Furthermore, by comparing the current user's behaviour with a selected population of users more successful than the current user for a given scenario, bespoke hints that incrementally improve the user's performance can be automatically generated for whatever level of proficiency the user is at.

It will be appreciated that when a game is newly launched, there will not be a pre-existing corpus of user statistics available from the public. However, such statistics can be gathered from a quality assurance testing phase of the game, or so-called early access or beta testing of the game to provide an initial set of user statistics.

Furthermore, in an embodiment of the present invention the game uploads the current user's statistics to a central server for incorporation into the wider corpus. Typically this will be anonymized, but alternatively at least some of the statistics could form part of a ranking scheme, for example for a multiplayer component of the game.

Non-limiting examples of measures of success include:
average level of health, either overall or after a battle;
average amount of money, either overall or after a transaction;
the acquisition of predetermined objects;
amount of available terrain explored; and
the user's character's in-game capabilities (e.g. incremental improvements in strength, skill or the like commonly found in games).

These measures of success could be absolute within the overall game, an area of the game, a character level, and/or a particular quest, or relative to an elapsed time within the overall game, an area of the game, a character level, and/or a particular quest.

Non-limiting examples of behaviour that could be measured for which hints could be provided include:
i. Timing:
when to strike or block an opponent (generally, in relation to a particular class, or in relation to an individual opponent);
whether to interact with a another in game character during day or night (again generally, in relation to a particular class, or in relation to an individual opponent);
whether to interact with another character after performing some other task; and
similarly, when to accelerate or brake on a racetrack.
ii. Weaponry/Equipment:
a particular choice of a weapon for an enemy (for example in relation to a particular class or in relation to an individual opponent)
a particular choice of armour for an enemy (for example in relation to a particular class or in relation to an individual opponent);
a particular choice of spell for an enemy (for example in relation to a particular class or in relation to an individual opponent); and
similarly, a particular choice of vehicle/tires/fuel load etc. for a particular race.
iii. Tactics:
what moves to use against an enemy (for example in relation to a particular class or in relation to an individual opponent);
where to fight an enemy (for example in relation to a particular class or in relation to an individual opponent);
who to use to fight an enemy (for example in relation to a particular class or in relation to an individual opponent); and
similarly, when to use a turbo charger or other limited resource during a race.
iv. Commerce:
with whom to buy or sell an item (either an individual person or item, or a class of people or items);
when to buy or sell an item (e.g. if seasonal or subject to supply/demand);
how to buy or sell an item (e.g. if a better price is obtained after drinking a charm potion); and
similarly, whether to upgrade engine, tyres, spoilers or other parts of a car given its current configuration.
v. Exploration:
when to use a particular tool (torch, pickaxe, compass etc.) in a given environment or particular place;
whether to conduct an additional search in a given environment or particular place (e.g. if a below-average amount of treasure has been found in an area);
whether to talk to a particular character or interact with a certain object (for example, if the elapsed time on a quest or between checkpoints in a game exceeds expectations, it may be because key information is missing; in the circumstances consider comparing the user's interactions with non-player characters or objects with those of successful players to see which were the most popular); and
similarly, whether to look for/take a shortcut somewhere on the race track.

Other examples will be apparent to the skilled person.

Figure 2:
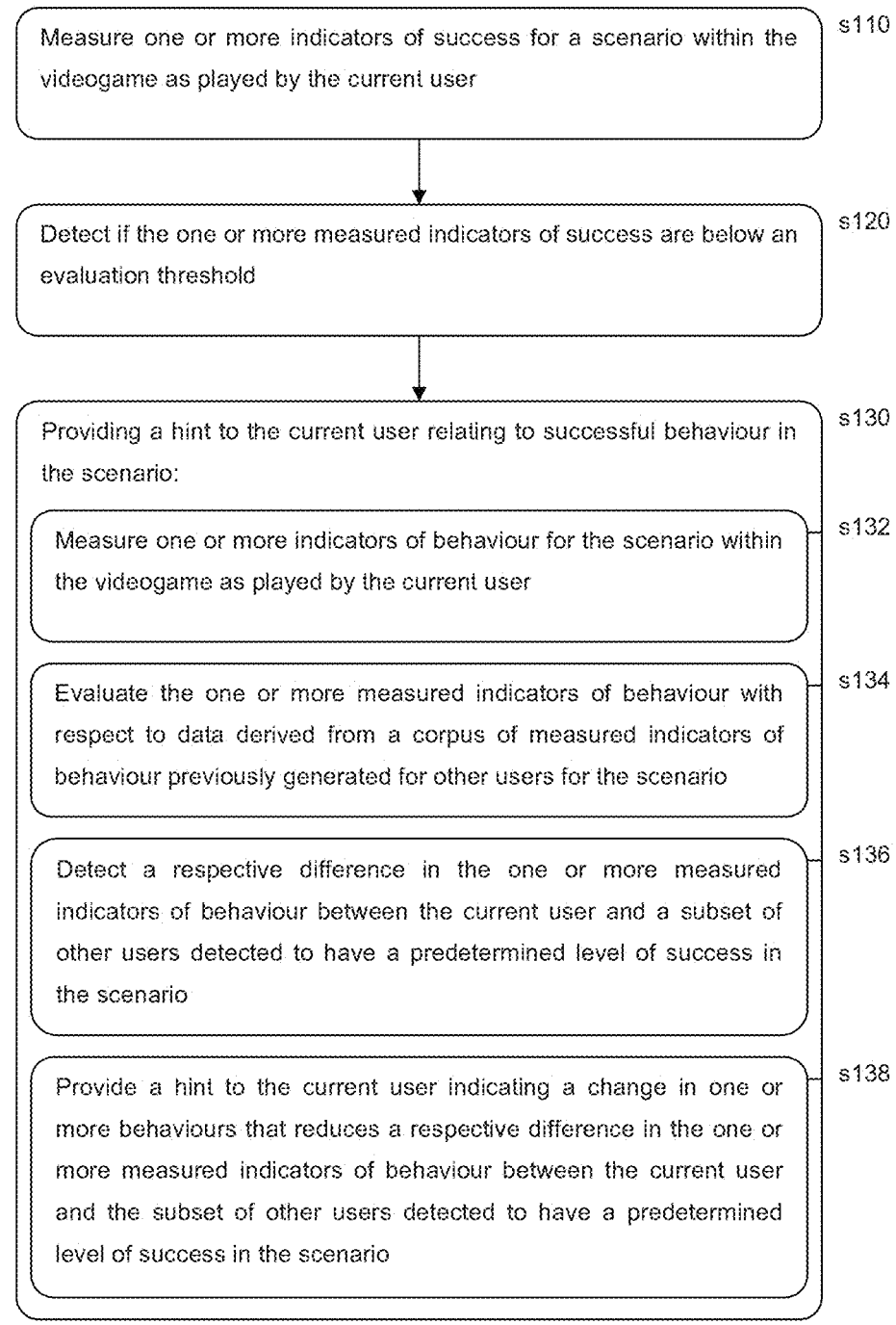
FIG. 2 is a flow diagram of a user analysis method of assisting a current user within the videogame in accordance with an embodiment of the present invention.

Turning now to FIG. 2, in a summary embodiment of the present invention, a user analysis method for assisting a current user within the videogame comprises:

In a first step s110, measuring one or more indicators of success for a scenario within the videogame as played by the current user, as described previously herein.

In a second step s120, detecting if the one or more measured indicators of success are below an evaluation threshold, which as described previously herein may be based on measures of success, failure or a combination of both, optionally weighted according to significance as determined by the game designer.

In a third step s130, providing a hint to the current user relating to successful behaviour in the scenario. As noted previously herein, hint can be constructed or selected in response to the apparent deficiencies in the user's behaviour compared to the sample population, and in the summary embodiment, this is done by the following sub-steps:

In a first sub-step s132, measuring one or more indicators of behaviour for the scenario within the videogame as played by the current user, as described previously herein.

In a second sub-step s134, evaluating the one or more measured indicators of behaviour with respect to data derived from a corpus of measured indicators of behaviour previously generated for other users for the scenario, as described previously herein.

In a third sub-step s136, detecting a respective difference in the one or more measured indicators of behaviour between the current user and a subset of other users detected to have a predetermined level of success in the scenario, as described previously herein.

And in a fourth sub-step s138, providing a hint to the current user indicating a change in one or more behaviours that reduces a respective difference in the one or more measured indicators of behaviour between the current user and the subset of other users detected to have a predetermined level of success in the scenario, as described previously herein.

In an instance of the summary embodiment, the method also comprises the step of evaluating the one or more measured indicators of success with respect to data derived from a corpus of measured indicators of success previously generated for other users for the scenario, and the evaluation threshold is based upon the data derived from the corpus of measured indicators of success previously generated for other users for the scenario. As noted previously, this means that the current user's success can be gauged against those of their peers, as an alternative to using predetermined thresholds of success (although of course these can still be used).

In this instance, the evaluation threshold is for example one selected from the list consisting of the average success of the subset of other users, M % below the average success of the subset of other users (where M is a predetermined number), and the $P^{th}$ standard deviation below the average success of the subset of other users (where P is a predetermined number), as described previously herein.

In an instance of the summary embodiment, at least one evaluating step comprises comparing the current user with a subset of other users for the scenario, the subset being one selected from the list consisting of all users, all users except those outside a predetermined number of standard deviations from the mean, above-average users; and, the most successful N % of users where N is a predetermined number, as determined by their respective evaluation of their measured indicators of success.

In an instance of the summary embodiment, the providing step in turn comprises the steps of calculating the largest respective difference between the one or more measured indicators of behaviour of the current user and those of the subset of other users detected to have a predetermined level of success in the scenario, and selecting the behaviour corresponding to the largest respective difference as the subject of the hint.

In this instance, if the respective differences between measured indicators of behaviour are themselves within a threshold difference, then the providing step comprises the steps of calculating the largest respective difference between the measured indicators of behaviour of the current user and those of a smaller subset of other users detected to have a higher predetermined level of success in the scenario, and selecting the behaviour corresponding to the largest respective difference as the subject of the hint.

In an instance of the summary embodiment, the providing step comprises the steps of calculating a change of success for a corresponding change of behaviour for two or more selected behaviours, by comparing for each selected behaviour in turn the measured indicators of behaviour of the current user with those of a selected subset of other users detected to have a predetermined level of success in the scenario and whose measured indicators of behaviour only differ from those of the user above a threshold amount in respect of the respective selected behaviour, and selecting the change in behaviour that corresponds to the largest improvement in success.

In an instance of the summary embodiment, the hint indicates a change of an in-game option to an option typical of the subset other users detected to have a predetermined level of success in the scenario.

In an instance of the summary embodiment, the hint indicates whether to increase or decrease a level of a behaviour responsive to the difference in the measured indicator of a respective behaviour between the current user and the subset of other users detected to have a predetermined level of success in the scenario.

In an instance of the summary embodiment, the hint is constructed in response to the difference between the measured indicator of the selected behaviour of the current user and that of the subset of other users detected to have a predetermined level of success in the scenario.

In an instance of the summary embodiment, the hint is a predefined hint relevant to the identified behaviour.

It will be appreciated that the above methods and techniques may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

As noted previously, a suitable piece of hardware is the Sony® PlayStation 4® entertainment device or console, operating under suitable software instruction.

Accordingly, in a summary embodiment of the present invention, a user analysis system for assisting a current user within the videogame (e.g. the entertainment device 10) comprises a measuring processor (e.g. CPU 20A operating under suitable software instruction) adapted to measure one or more indicators of success for a scenario within the videogame as played by the current user, a detecting processor (e.g. CPU 20A operating under suitable software instruction) adapted to detect if the one or more measured indicators of success are below an evaluation threshold; and if so, a providing processor (e.g. CPU 20A operating under suitable software instruction) adapted to provide a hint to the current user relating to successful behaviour in the scenario. The providing processor is also adapted to measure one or more indicators of behaviour for the scenario within the videogame as played by the current user, and adapted to evaluate the one or more measured indicators of behaviour with respect to data derived from a corpus of measured indicators of behaviour previously generated for other users for the scenario. The providing processor is also adapted to detect a respective difference in the one or more measured indicators of behaviour between the current user and a subset of other users detected to have a predetermined level of success in the scenario, and to provide a hint to the current user indicating a change in one or more behaviours that reduces a respective difference in the one or more measured indicators of behaviour between the current user and the subset of other users detected to have a predetermined level of success in the scenario, as described previously herein.

In an instance of this summary embodiment, the user analysis system comprises an evaluation processor (e.g. CPU 20A operating under suitable software instruction) adapted to evaluate the one or more measured indicators of success with respect to data derived from a corpus of measured indicators of success previously generated for other users for the scenario, and the evaluation threshold is based upon the data derived from the corpus of measured indicators of success previously generated for other users for the scenario.

In an instance of this summary embodiment, the providing processor is adapted to calculate the largest respective difference between the one or more measured indicators of behaviour of the current user and those of the subset of other users detected to have a predetermined level of success in the scenario, and the providing processor is adapted to select the behaviour corresponding to the largest respective difference as the subject of the hint.

In an instance of this summary embodiment, the providing processor is adapted to construct the hint in response to the difference between the measured indicator of the selected behaviour of the current user and that of the subset of other users detected to have a predetermined level of success in the scenario.

It will be appreciated that as noted above, the user analysis system may optionally implement any other of the methods and techniques disclosed herein when adapted by suitable software instruction to do so.

The invention claimed is:

1. A user analysis method of assisting a current user within a videogame, comprising the steps of:
   measuring one or more indicators of success for a scenario within the videogame as played by the current user;
   detecting if the one or more measured indicators of success are below an evaluation threshold; and if so,
   providing a hint to the current user relating to successful behaviour in the scenario; wherein providing a hint comprises:
   measuring one or more indicators of behaviour for the scenario within the videogame as played by the current user;
   evaluating the one or more measured indicators of behaviour with respect to data derived from a corpus of measured indicators of behaviour previously generated for other users for the scenario;
   detecting a respective difference in the one or more measured indicators of behaviour between the current user and a subset of other users detected to have a predetermined level of success in the scenario;
   the providing step further comprising providing a hint to the current user indicating a change in one or more behaviours that reduces a respective difference in the one or more measured indicators of behaviour between the current user and the subset of other users detected to have a predetermined level of success in the scenario; and
   evaluating the one or more measured indicators of success with respect to data derived from a corpus of measured indicators of success previously generated for other users for the scenario,
   wherein the evaluation threshold is based upon the data derived from the corpus of measured indicators of success previously generated for other users for the scenario.

2. The user analysis method of claim 1, in which the evaluation threshold is one selected from the list consisting of:
   i. the average success of the subset of other users;
   ii. M % below the average success of the subset of other users, where M is a predetermined number; and
   iii. the $P^{th}$ standard deviation below the average success of the subset of other users,
   where P is a predetermined number.

3. The user analysis method of claim 1, in which at least one evaluating step comprises comparing the current user with a subset of other users for the scenario, the subset being one selected from the list consisting of:
   i. all users;
   ii. all users except those outside a predetermined number of standard deviations from the mean;
   iii. above-average users; and
   iv. the most successful N % of users where N is a predetermined number, as determined by their respective evaluation of their measured indicators of success.

4. The user analysis method of claim 1, in which the providing step comprises the steps of:
   calculating the largest respective difference between the one or more measured indicators of behaviour of the current user and those of the subset of other users detected to have a predetermined level of success in the scenario, and
   selecting the behaviour corresponding to the largest respective difference as the subject of the hint.

5. The user analysis method of claim 4, in which if the respective differences between measured indicators of behaviour are themselves within a threshold difference, then the providing step comprises the steps of:
   calculating the largest respective difference between the measured indicators of behaviour of the current user and those of a smaller subset of other users detected to have a higher predetermined level of success in the scenario, and
   selecting the behaviour corresponding to the largest respective difference as the subject of the hint.

6. The user analysis method of claim 1, in which the providing step comprises the steps of:
   calculating a change of success for a corresponding change of behaviour for two or more selected behaviours, by comparing for each selected behaviour in turn the measured indicators of behaviour of the current user with those of a selected subset of other users detected to have a predetermined level of success in the scenario and whose measured indicators of behaviour only differ from those of the user above a threshold amount in respect of the respective selected behaviour, and
   selecting the change in behaviour that corresponds to the largest improvement in success.

7. The user analysis method of claim 1, in which the hint indicates a change of an in-game option to an option typical of the subset other users detected to have a predetermined level of success in the scenario.

8. The user analysis method of claim 1, in which the hint indicates whether to increase or decrease a level of a behaviour responsive to the difference in the measured indicator of a respective behaviour between the current user and the subset of other users detected to have a predetermined level of success in the scenario.

9. The user analysis method of claim 1, in which the hint is one selected from the list consisting of:
   i. a hint constructed in response to the difference between the measured indicator of the selected behaviour of the current user and that of the subset of other users detected to have a predetermined level of success in the scenario; and
   ii. a predefined hint relevant to the identified behaviour.

10. A non-transitory, computer readable medium having computer executable instructions stored thereon, which when executed by a computer system, causes the computer system to assist a current user within a videogame by carrying out actions, comprising:
    measuring one or more indicators of success for a scenario within the videogame as played by the current user;
    detecting if the one or more measured indicators of success are below an evaluation threshold; and if so,
    providing a hint to the current user relating to successful behaviour in the scenario; wherein providing a hint comprises:
    measuring one or more indicators of behaviour for the scenario within the videogame as played by the current user;

evaluating the one or more measured indicators of behaviour with respect to data derived from a corpus of measured indicators of behaviour previously generated for other users for the scenario;

detecting a respective difference in the one or more measured indicators of behaviour between the current user and a subset of other users detected to have a predetermined level of success in the scenario;

the providing step further comprising providing a hint to the current user indicating a change in one or more behaviours that reduces a respective difference in the one or more measured indicators of behaviour between the current user and the subset of other users detected to have a predetermined level of success in the scenario; and evaluating the one or more measured indicators of success with respect to data derived from a corpus of measured indicators of success previously generated for other users for the scenario, wherein the evaluation threshold is based upon the data derived from the corpus of measured indicators of success previously generated for other users for the scenario.

11. A user analysis system arranged to assist a current user within a videogame, comprising:

a measuring processor adapted to measure one or more indicators of success for a scenario within the videogame as played by the current user;

a detecting processor adapted to detect if the one or more measured indicators of success are below an evaluation threshold; and if so, a providing processor adapted to provide a hint to the current user relating to successful behaviour in the scenario;

the providing processor being adapted to measure one or more indicators of behaviour for the scenario within the videogame as played by the current user;

the providing processor being adapted to evaluate the one or more measured indicators of behaviour with respect to data derived from a corpus of measured indicators of behaviour previously generated for other users for the scenario;

the providing processor being adapted to detect a respective difference in the one or more measured indicators of behaviour between the current user and a subset of other users detected to have a predetermined level of success in the scenario;

the providing processor being adapted to provide a hint to the current user indicating a change in one or more behaviours that reduces a respective difference in the one or more measured indicators of behaviour between the current user and the subset of other users detected to have a predetermined level of success in the scenario; and an evaluating processor adapted to evaluate the one or more measured indicators of success with respect to data derived from a corpus of measured indicators of success previously generated for other users for the scenario, wherein the evaluation threshold is based upon the data derived from the corpus of measured indicators of success previously generated for other users for the scenario.

12. The user analysis system of claim 11, comprising:

an evaluation processor adapted to evaluate the one or more measured indicators of success with respect to data derived from a corpus of measured indicators of success previously generated for other users for the scenario;

and in which the evaluation threshold is based upon the data derived from the corpus of measured indicators of success previously generated for other users for the scenario.

13. The user analysis system of claim 11, in which:

the providing processor is adapted to calculate the largest respective difference between the one or more measured indicators of behaviour of the current user and those of the subset of other users detected to have a predetermined level of success in the scenario, and the providing processor is adapted to select the behaviour corresponding to the largest respective difference as the subject of the hint.

14. The user analysis system of claim 11, in which:

the providing processor is adapted to construct the hint in response to the difference between the measured indicator of the selected behaviour of the current user and that of the subset of other users detected to have a predetermined level of success in the scenario.

\* \* \* \* \*